May 3, 1932. W. A. BROWN 1,856,314
TIRE
Filed Jan. 2, 1931 3 Sheets-Sheet 1
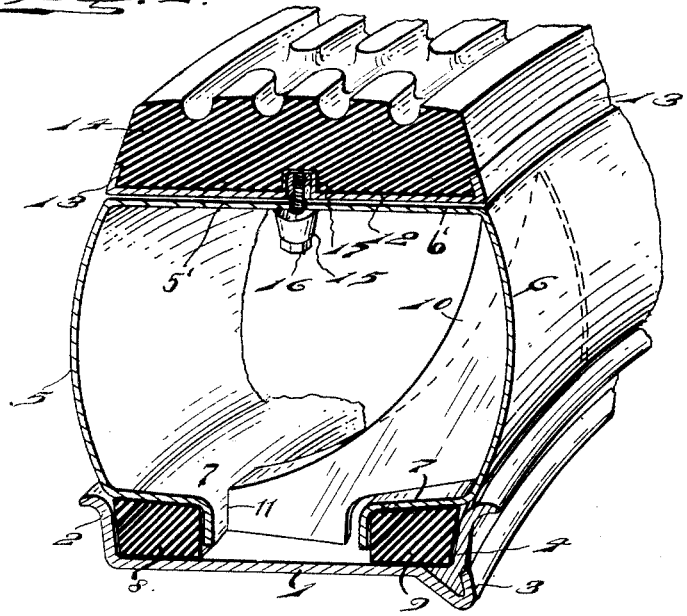
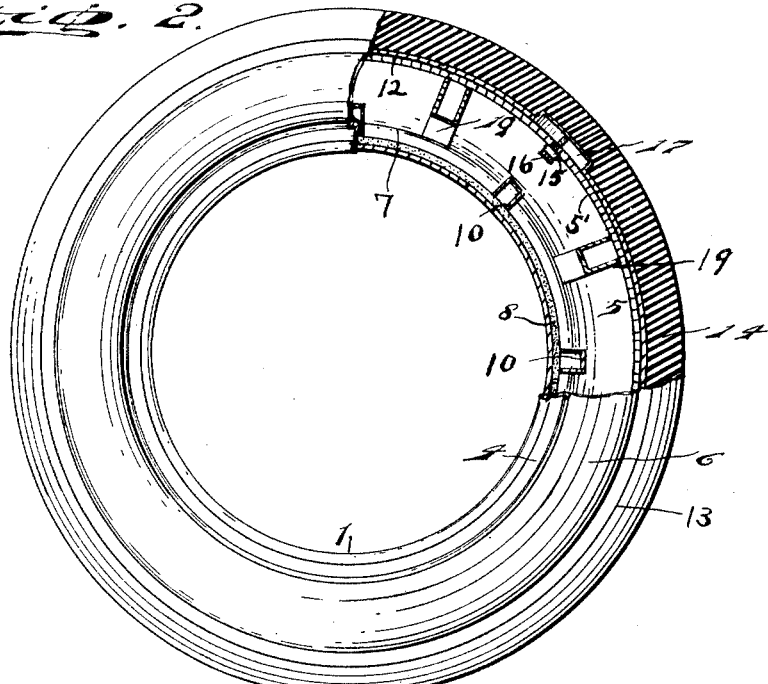
INVENTOR.
William A. Brown
BY
J Herbert S Fairbanks
ATTORNEY.

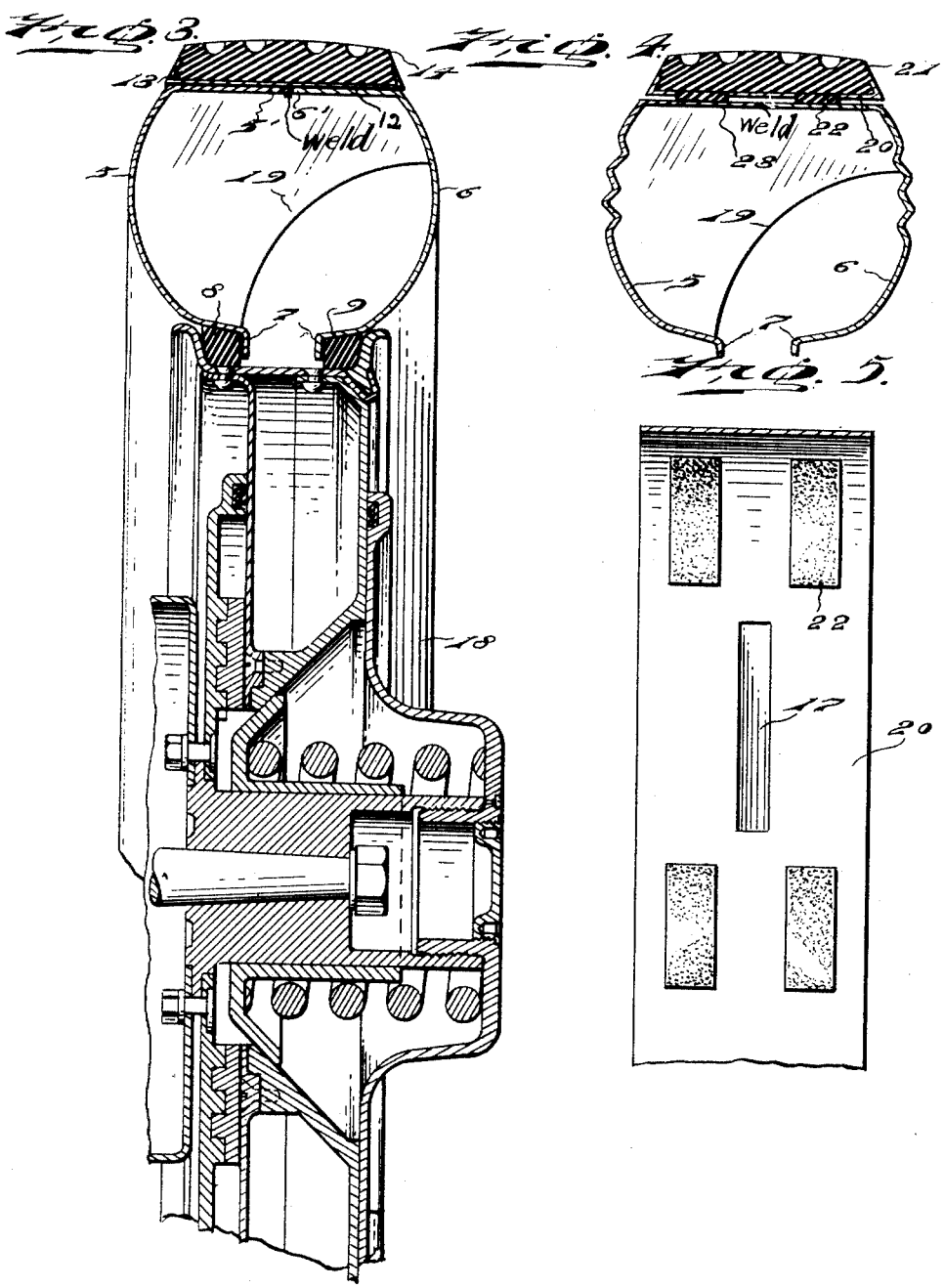

May 3, 1932. W. A. BROWN 1,856,314
TIRE
Filed Jan. 2, 1931   3 Sheets-Sheet 3
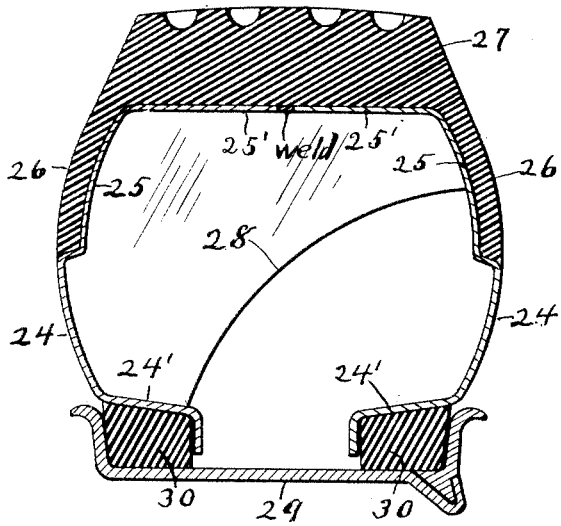
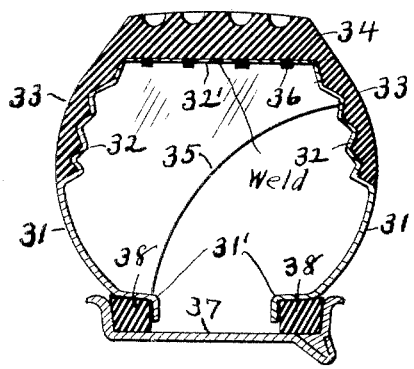
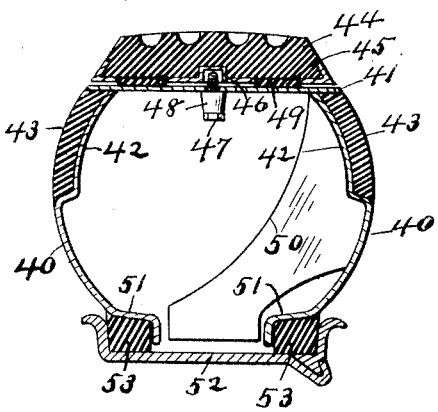
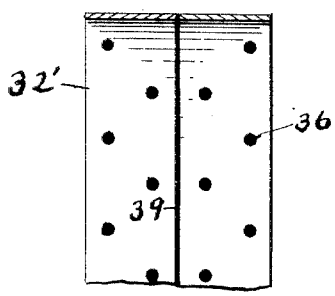
INVENTOR.
William A. Brown
BY Herbert S. Fairbanks
ATTORNEY.

Patented May 3, 1932

1,856,314

UNITED STATES PATENT OFFICE

WILLIAM A. BROWN, OF PHILADELPHIA, PENNSYLVANIA

TIRE

Application filed January 2, 1931. Serial No. 506,144.

One of the principal advantages claimed for resilient or flexible wheels and similar constructions which provide special independent springing of the wheel and a positive reduction of unsprung weight is that they do not require the use of a pneumatic tire. The resiliency of the wheel itself is enough to absorb road shocks and the use of cushion or solid tires is permitted without any loss in riding comfort. However, in practice it has been found that the excessive weight of the usual solid or cushion tire and its band, which is unsprung and located at the periphery of the wheel, where weight is least desirable, creates a bounding action and imposes a handicap on the operation of flexible or resilient wheels, and similar constructions which provide special independent springing of the wheel and a positive reduction of unsprung weight.

It is therefore the object of this invention to devise a novel construction and arrangement of a tire which can be made as light as a pneumatic tire and as durable as a cushion or solid tire and which is especially adapted for use with a flexible or resilient wheel, and similar constructions which provide special independent spring of the wheel and a positive reduction of unsprung weight.

It is a further object of this invention to devise a novel construction and arrangement of a tire having its walls formed by rigid light weight metal stampings, preferably of high tensile capacity.

A further object of this invention is to provide a number of reinforcing ribs within said tire and preferably welded to its walls to prevent its collapse under impact, particularly from sudden shock in climbing curbings, etc.

A further object of this invention is to provide a novel resilient seat preferably of rubber which is interposed between the inside flanges of my tire and the outside surface of the rim on which it is mounted, and serves to rigidly hold the tire on the rim. By leaving a space between the inside diameter of my tire and the outside diameter of the rim on which it is to be mounted and inserting resilient bands under pressure in these spaces on each side, any minor irregularities in the form of the rim or of the tire will be compensated for by these bands and the removal or mounting of the tire can be quickly accomplished. If the metal tire was made to fit the metal rim, any minor change in the contour of either due to road shock would cause the tire to jam on the rim and it would be worthless. The use of a resilient seat to hold the tire in spaced relation with its rim also eliminates the metallic or booming noises present in an uneven metal to metal contact, such as is bound to be present in this instance. The use of a resilient spacer or seat preferably of rubber and held in position under pressure will also minimize the possibility of relative circumferential movement between my metal tire and the rim on which it is mounted.

A further object of this invention is to provide a removable resilient tread preferably of rubber to absorb minor road shocks which would not be transmitted to the wheel itself.

A further object of this invention is to provide a thin resilient spacer preferably of rubber and interposed between the metal band to which the rubber tread is attached and the outside wall of the tire on which it is mounted, to eliminate any noises arising from direct metal to metal contact. This construction will only be required on heavy duty vehicles.

A further object of this invention is to provide a novel means for preventing relative circumferential, outward or inward movement between the removable metal band which holds the resilient tread and the outside wall of the tire which supports it. It is to be understood that the metal band which holds the resilient tread will be in frictional engagement with the outside wall of the tire which supports it as a further precaution to prevent movement between the metal band which holds the resilient tread and the outside wall of the tire which supports it.

A further object of this invention is to provide a permanent resilient tread preferably of rubber and having means to effect a permanent bond between said resilient material and the metal tire. This construction is desirable for use on heavy duty vehicles.

A further object of this invention is to devise a novel construction and arrangement of a rigid light weight metal tire comprising two stampings having the same contour and welded together at the center of their periphery. For heavy duty service where side impact might mar the tire wall, the outboard half of my tire is preferably of a better and stronger metal than the inboard half. In some cases both the outboard and inboard walls of the tire or either wall may be deformed to increase their strength.

A further object of this invention is to provide a rigid light weight metal tire having a resilient tread and constructed to be interchangeable with any standard pneumatic tire on any standard rim.

A further object of this invention is to devise a novel construction of a metal tire comprising two stampings having the same contour and welded at their periphery to a third stamping to provide a space on either side of the tire to which may be attached a layer of resilient material, preferably of rubber, which would act as a bumper to prevent scarring of the side walls of the tire in climbing curbings, etc.

With the above and other objects in view as will hereinafter clearly appear my invention comprehends a novel tire.

It further comprehends a novel tire and a novel manner of mounting it on its rim.

For the purpose of illustrating my invention I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1 is a sectional elevation in perspective of a tire embodying my invention.

Figure 2 is a side elevation thereof, a portion of the tire being broken away.

Figure 3 is a sectional view of the tire in connection with a portion of a flexible wheel of a well known type.

Figure 4 is a sectional elevation of another embodiment of my invention.

Figure 5 is a detailed view showing the rubber of the tread bonded to the openings in the annular band which carries it and also showing a slot to receive locking means to prevent relative movement between said band and its support.

Figure 6 is a sectional elevation of the tire in detached position.

Figure 7 is a sectional elevation of another embodiment of my invention, and showing special means for bonding a permanent tread to the tire.

Figure 8 is a detail of the construction showing more particularly the manner in which the permanent tread is bonded to its support.

Figure 9 is a sectional elevation of another embodiment of my invention.

Similar numerals of reference indicate corresponding parts in all figures.

1 designates a rim, of any desired or conventional type, having at one side a fixed annular flange 2, which at its free marginal portion, is curved outwardly. The rim 1 at its opposite side is provided with a hooked shaped flange 3 adapted to receive a split locking ring 4. 5 and 6 designate, respectively, the side walls of the tire which are formed from light weight metal stampings having the desired tensile capacity. These side walls at their inner portions are deflected laterally and inwardly, as at 7, so that they contribute with the rim 1 to form annular pockets at the sides which receive the resilient and flexible seating members 8 and 9, respectively. The outer side wall 6, of the tire, is reinforced by a desired number of brace members 10 formed from sheet metal into segmental box-like structures having the inwardly extending walls 11 at their inner ends. These braces 10 are preferably welded to the side wall 6 throughout the length of their contacting portions and are cut away to clear the juxtaposed flanges 7.

An annular band 12 is provided with outwardly converging flanges 13 and carries a tread 14 which may be of any desired character. This tread 14, is preferably made of rubber or rubber compound and is indented to form a non-skid surface. It is also substantially flat across the area of road contact.

The side walls 5 and 6 have substantially the same contour, and terminate in lateral extensions 5' and 6' which are welded together on the center line of the tire. 15 designates lugs which are welded to the lateral extensions 5' and 6' of the side walls 5 and 6 and are threaded to receive the bolts 16 which extend into the recesses 17 in the annular band 12. These recesses 17 are circumferentially spaced from each other and are formed by inwardly deflecting the metal band 12 of which they are a part, as will be clearly understood by reference to Figures 2 and 5. By extending the bolts 16 into the recesses 17, lateral as well as circumferential displacement of the annular band 12, on the lateral extensions 5' and 6' of the side walls 5 and 6, which support it, and which is in frictional engagement with it, is prevented.

The tire with the rim 1, on which it is mounted, is adapted to be carried by a flexible or resilient wheel 18 of a well known type. such as, for example, that shown in Figure 3. The construction of this wheel, as illustrated conforms to that of U. S. Patent No. 1,664,389, dated March 27, 1928, and it is, therefore, not believed to be necessary to explain in full detail the construction and operation of the wheel, per se, as the tire can be used with any type of flexible or resilient wheel, or construction that provides independent springing of the wheel with a shock absorbing axle suspension to absorb road shocks. As shown, the flexible wheel has the driving and driven members connected in driving relationship by means of a driving ring splined thereto and the parts are retained in assembled position by means of a heavy spring which normally tends to move a cone-shaped bearing member towards the bowl in which it is mounted.

If desired the wall 5 may also be reinforced by means of brace members 19 which are welded to the wall 5 and to the lateral extensions 5' and 6' of the walls 5 and 6, and to the inner surface of the upper portion of the wall 6, as will be understood from Figure 3. These braces 19 are formed from metal stampings having integral side walls as will be understood from Figure 2. The side walls 5 and 6 with their lateral extensions 5' and 6', which terminate in a welded joint on the center line of the tire, are preferably of the same contour and are interchangeable with each other. The position and function of the flexible seating members 8 and 9 which hold the laterally and inwardly deflected portions 7 of the side walls 5 and 6 in spaced relation with the rim 1, to enable quick and easy mounting and demounting of the tire on the rim and to hold it in the desired position under pressure to prevent circumferential movement between the tire and the rim, will be clearly understood from Figure 3.

The braces 10 shown in Figure 1 terminate a desired distance from the wall formed by the inwardly deflected portion 7 of the side wall 5 and the braces 19 shown in Figure 3 terminate at a point adjacent to the lateral extension of the side wall 6 so that the requisite inward movement under pressure of the lower portion of the side wall 6 is provided, to enable the mounting of the tire upon its rim. It is to be understood that the number and tensile strength of the braces 10 and 19 are determined by the service to which the tire is to be subjected. In heavy duty work more will be used and of greater strength than is necessary in light delivery work and in many cases they can be dispensed with entirely if the tire is used on certain types of pleasure cars.

Referring now to Figures 4 and 5, I have shown in these figures an annular band 20 corresponding to the annular band 12 and the rubber tread 21 is bonded through this band as at 22 so that there is a spaced resilient frictional engagement with the laterally extending support 23 which corresponds to the laterally extending portions 5' and 6' of the side walls 5 and 6. The position of the recess 17 shown in Figures 1 and 2 on the annular band 12 which supports the resilient tread will be clearly understood from Figure 5. The position of the brace 19 is the same as that shown in Figure 3. In some instances it is desirable to strengthen the side walls 5 and 6 by means of corrugations to prevent collapse under sever impact and the preferred location and depth of these corrugations will be clearly understood from Figure 4.

Referring now to the embodiment seen in Figure 6, the side walls 24 and their lateral extensions 25' which are welded on the center line of the tire are made from sheet metal stampings having their lateral and inward deflected flanges 24' corresponding to those shown in Figures 1 and 3, but intermediate their depths they are inwardly deflected as at 25 so that the rubber 26 of the tread 27 extends along the outer portions of their side walls. The reinforcement 28 shown is similar to that of the reinforcement 19, shown in Figure 3, and the tire is spaced from its rim 29 by means of the annular resilient seating members 30.

Referring now to the embodiment seen in Figure 7, the side walls 31 at their outer portions are corrugated as at 32 to receive the extensions 33 of the tread 34. The reinforcements 35 are welded to the side walls 31 and also to their lateral extensions 32', and the rubber of the tread 34 is bonded at 36 with the lateral extensions 32' of the side walls 31. The inner and laterally deflected flanges 31' of the side walls 31 are similar to that already described in conjunction with Figures 1, 3 and 6, as they are deflected to form with the rim 37, annular side pockets to receive the resilient spacers 38.

In Figure 8 the rubber of the tread is shown as extending through the lateral extension 32' of the side walls 31 and the welding of such lateral extension of the side walls on the center line of the tire is shown at 39.

Referring now to the embodiment seen in Figure 9, the side walls 40 have the same general contour as that shown in Figure 6 except that instead of extending laterally inwardly at their outer portions they are cut off and welded to a transversely disposed annular band 41 and the annular side pockets formed by the inwardly depressed portions 42 are covered with rubber 43 bonded thereto in any desired manner and forming a continuation of the outer faces of the side walls. The tread portion 44 is carried by an annular band 45 having its marginal portions converging outwardly. The annular band 45 has the depressions 46 to receive the fastening devices 47 which are carried by the lugs 48 circumferentially spaced from each other and welded to the annular band 41. Between the annular band 41 and the band 45, I provide, in this instance, spaced rubber strips 49, which prevent any metallic contact between the parts, and are bonded to the annular band 45 as shown in Figures 4 and 5. The reinforcement 50 corresponds in general to the reinforcement 10 of Figure 1 and is preferably welded to the juxtaposed side wall 40 of the tire. The inwardly deflected flanges 51 and the rim 52 form side pockets to receive the annular cushions 53 which hold the tire in spaced relation to the rim and are similar to those shown in Figures 1, 3, 6 and 7.

In all the embodiments of my invention herein shown the walls of the tire are formed of light weight metal stampings which carry the resilient tread portion, and which, at their inner portions, are deflected to form annular side pockets in conjunction with the rim to receive resilient strips, which act as a seat for the tire on the rim. The walls of the tire are preferably of a rigid construction, and any resiliency required is to be obtained outside of the tire by means of a flexible wheel and other similar constructions having a shock absorbing axle suspension to provide a minimum of unsprung weight.

Having thus described my invention what I claim as new and desire to secure by Letters Patent, is:—

1. A tire comprising annular metal bands contributing to form the side walls of the tire and connected at their outer peripheries to form a tread support, a resilient tread member mounted on said support, the inner peripheries of said bands forming side pockets, and annular cushioning members in said pockets.

2. A tire comprising annular metal bands contributing to form the side walls of the tire and connected at their outer portions to form a tread support, a resilient tread member removably mounted on said support, said bands being curved in cross section with the inner portions deflected to form pockets, and cushioning members in said pockets.

3. A tire comprising annular metal bands contributing to form the side walls of the tire and connected at their outer portions to form an annular tread support, a resilient tread on said support, the inner portions of said bands being deflected to form pockets, and cushioning members in said pockets, and reinforcements carried by one of said bands and having limited lateral movement towards the other band.

4. A tire comprising spaced endless metal bands contributing to form the walls of the tire, a resilient tread member, an annulus in which said tread member is carried to form a unit of structure demountably carried by said walls, and means to resiliently connect the inner portions of said walls with a rim.

5. A tire comprising spaced endless metal bands connected at their outer portions to form a tread support, a resilient tread on said support, the inner portions of said bands being deflected laterally and inwardly to form annular side pockets, circumferentially spaced reinforcements fixed to the inner face of the outer band and having their free ends spaced from the wall of the pocket of the other band, and cushioning members in said pockets.

6. A tire comprising annular metal bands contributing to form the side walls of the tire and connected at their outer peripheries to form a tread support, a resilient tread member mounted on said support, circumferentially spaced reinforcing members carried by said bands, the inner peripheries of said bands forming side pockets, and annular cushioning members in said pockets.

7. A tire comprising annular metal bands contributing to form the side walls of the tire and connected at their outer portions to form a tread support, a resilient tread member mounted on said support, circumferentially spaced reinforcing members carried by said bands, a rim, and annular cushioning members between said bands and rim to prevent a metal to metal contact.

8. A tire comprising annular metal bands contributing to form the side walls of the tire and connected at their outer portions to form a tread support, a resilient tread member removably mounted on said support, circumferentially spaced reinforcing members carried by said bands, said bands being curved in cross section with the inner portions deflected to form pockets, and cushioning members in said pockets.

9. A tire comprising annular metal bands contributing to form the side walls of the tire and connected at their outer peripheries to form a tread support, a resilient tread member mounted on said support, said side walls being deformed to increase their strength, the inner peripheries of said bands forming side pockets, and annular cushioning members in said pockets.

10. A tire comprising annular metal bands contributing to form the side walls of the tire and connected at their outer portions to form a tread support, a resilient tread member removably mounted on said support, said side walls being deformed to increase their strength, and said bands being curved in cross section with the inner portions deflected to form pockets, and cushioning members in said pockets.

11. A tire comprising annular metal bands contributing to form the side walls of the tire and connected at their outer peripheries to form a tread support, a resilient tread member mounted on said support, said side walls being deformed to increase their strength, and circumferentially spaced reinforcements carried by said bands, the inner peripheries of said bands forming side pockets, and annular cushioning members in said pockets.

12. A tire comprising annular metal bands contributing to form the side walls of the tire and connected at their outer portions to form a tread support, a resilient tread member removably mounted on said support, said side walls being deformed to increase their strength, and circumferentially spaced reinforcements carried by said bands, said bands being curved in cross section with the inner portions deflected to form pockets, and cushioning members in said pockets.

13. A tire comprising annular metal bands contributing to form the side walls of the tire and connected at their outer portions to form an annular tread support, a resilient tread on said support, said side walls being deformed to increase their strength, the inner portions of said bands being deflected to form pockets and cushioning members in said pockets, and reinforcements carried by one of said bands and having limited lateral movement towards the other band.

WILLIAM A. BROWN.